United States Patent
O'Neil et al.

(10) Patent No.: US 9,730,301 B2
(45) Date of Patent: Aug. 8, 2017

(54) WIRELESS LIGHTING CONTROL MODULE ASSOCIATED WITH A RELAY FOR CONTROLLING LIGHTING POWER OUTPUT

(71) Applicant: EPTronics, Inc., Gardena, CA (US)

(72) Inventors: Tom O'Neil, Torrance, CA (US); Lee Chiang, Sylmar, CA (US)

(73) Assignee: EPTRONICS, INC, Gardena, CA (US)

( * ) Notice: Subject to any disclaimer, the term of this patent is extended or adjusted under 35 U.S.C. 154(b) by 0 days.

(21) Appl. No.: 15/254,492

(22) Filed: Sep. 1, 2016

(65) Prior Publication Data
US 2017/0135186 A1    May 11, 2017

Related U.S. Application Data

(60) Provisional application No. 62/252,363, filed on Nov. 6, 2015.

(51) Int. Cl.
H05B 37/02 (2006.01)
H05B 33/08 (2006.01)
H04W 4/00 (2009.01)

(52) U.S. Cl.
CPC ..... *H05B 37/0272* (2013.01); *H05B 33/0815* (2013.01); *H05B 33/0845* (2013.01); *H04W 4/005* (2013.01)

(58) Field of Classification Search
CPC .................................................. H05B 37/0272
USPC ........................................ 315/291, 307, 308
See application file for complete search history.

(56) References Cited

U.S. PATENT DOCUMENTS

| 5,146,153 | A | * | 9/1992 | Luchaco | G08C 17/00 315/291 |
| 5,237,264 | A | * | 8/1993 | Moseley | G08C 17/00 315/291 |
| 6,990,394 | B2 | * | 1/2006 | Pasternak | H04L 12/2602 455/3.01 |
| 8,791,655 | B2 | | 7/2014 | Sadwick | |
| 9,167,382 | B2 | * | 10/2015 | Arvidsson | H04W 4/021 |

(Continued)

FOREIGN PATENT DOCUMENTS

CN    101882367    11/2010
CN    202873154    4/2013

OTHER PUBLICATIONS

Rea, M.S. (ed.). 2000. IESNA Lighting Handbook: Reference and Application, 9th Edition. New York: Illuminating Engineering Society of North America.

(Continued)

*Primary Examiner* — Thuy Vinh Tran
(74) *Attorney, Agent, or Firm* — Clement Cheng

(57) ABSTRACT

A wireless lighting control module for LED lighting includes a Zigbee wireless receiver receiving an input wireless control signal, an analog control output which conforms to the 0-10V format, and a microcontroller which is connected to the wireless receiver and receives the input wireless control signal from the wireless receiver. The microcontroller regulates the analog control output. The analog control output has a predetermined cutoff level. A lighting power output is controlled by the microcontroller and cut off by opening a relay when the analog control output is below the predetermined cutoff level. The predetermined cutoff level of the analog control output is 0.5V.

9 Claims, 4 Drawing Sheets

(56) References Cited

U.S. PATENT DOCUMENTS

2008/0231464 A1* 9/2008 Lewis ................ H05B 37/0272
340/5.74
2016/0037615 A1 2/2016 Davis

OTHER PUBLICATIONS

ZigBee Wireless Networks and Transceivers by Shahin Farahani. Published by Newnes, Apr. 2011.
European Committee for Electrotechnical Standardization. 2006. AC-supplied electronic ballasts for tubular fluorescent lamps—Performance Requirements. CENELEC.

* cited by examiner

WIRELESS LIGHTING CONTROL MODULE ASSOCIATED WITH A RELAY FOR CONTROLLING LIGHTING POWER OUTPUT

The present invention is a non-provisional of U.S. provisional application 62/252,363 filed Nov. 6, 2015, by same first named inventor O'Neil, entitled Wireless Lighting Control Module For LED Drivers the disclosure of which is incorporated herein by reference, being filed by EPtronics, Inc. assignee.

FIELD OF THE INVENTION

The present invention is in the field of wireless lighting control modules. More specifically, the present invention pertains to devices which can be added on to dimming lights which have analog (0-10V) controls. These devices run off the ac power lines, receive wireless control signals and can be connected to the input wires of dimming lights in order to control them wirelessly.

DISCUSSION OF RELATED ART

A variety of wireless control systems such as Zigbee wireless control systems have become relatively common in general illumination, particularly for controlling LED lighting. An example of a Zigbee lighting control system is that described by Davies in US20160037615. A room or even a building full of lights has the lights wirelessly in contact with each other and a central controller. The power of the system is that each radio transmitter may be of relatively low energy since the lighting units pass the control signals on to one another to spread the commands around the building. Lights may be given digital identities so that groups of lights can be operated together separately from other lights or groups in the system. A weakness of such a system as described by Davies is that all the drivers or ballasts are consuming some energy the entire time that they are switched on, even when set to the lowest possible setting.

Also, many lighting companies may not wish to buy expensive Zigbee controlled ballasts or drivers. They may be well familiar with conventional analog dimming LED drivers or ballasts. For such companies it could be very helpful if they could simply buy an add-on Zigbee dimming module which when combined in a lighting fixture with a conventional analog dimming driver or ballast would then provide a Zigbee controlled lighting fixture. Also sometimes there may exist analog dimming systems in which many perfectly good dimming drivers or ballasts are all controlled off one analog control so that they all dim together. If a stand-alone Zigbee controller could be added in place of the analog control, then the whole installation can be readily converted into a modern, sophisticated digital dimming system. Most of the existing Zigbee controlled lighting systems have a further problem in that when the light is commanded to an extremely low level, the light output may become unstable and in common parlance, appear to flicker. It would be very desirable if a Zigbee controller could be created which would totally shut off the light once the output was commanded to go below a predetermined low light level. It would be even more desirable if the light was shut off by opening a relay switch placed in the power line providing power to each light, thus reducing the input power nearly to zero and saving energy in the off state.

For example, Chinese patent CN 202873154 U, describes a Zigbee lighting controller including a Zigbee wireless receiver, and circuitry joining this onto a microcontroller and a digital potentiometer to operate an analog control bus. However there is no mention of incorporating a relay to cut off the light being controlled. When operating a digital dimming system, it is highly desirable to be able to modulate the output with respect to the input according to a chosen response curve, for example the IES square law dimming curve as described by Rea in the $9^{th}$ edition of the IES lighting handbook. This patent has no mention of having a nonlinear transformation between the Zigbee signal received and the output control signal.

Chinese patent CN 101882367 B describes a basic Zigbee control system and its digital architecture. However the system is not particularized for lighting and lacks description of a high current output, a cut off relay or the possibility of a nonlinear transformation between the Zigbee control signal and the output signal. Davies in US20160037615 describes a Zigbee system which includes a lighting module (300 in FIGS. 3 and 4) but this module is used to modulate the power from a ballast or LED driver and does not operate an analog dimming input to the ballast, which is the most cost effective way to control the dimming. None of the references mentioned describe how nonlinear transformations can be enabled.

There exist numerous prior art references describing putting Zigbee controls inside a lighting fixture. A representative example is U.S. Pat. No. 8,791,655 "LED lamp with remote control", by Sadwick et al. This patent lacks the concept of having a stand-alone Zigbee controller that can be used with any dimming driver or ballast that has an analog dimming control input, which is the subject of the present invention.

In summary, all the related art fails to disclose an add-on Zigbee controller that can work with any driver or ballast having a 0-10V analog control input, has a relay which can decisively cut off the driver at low light levels to prevent flickering, and which can be custom programmed to represent the IES square law and other desirable dimming response curves. Non of the prior art describes a Zigbee controller that can output as much as 100 mA in order to drive a large number of LED drivers. The present invention meets these unmet needs.

SUMMARY OF THE INVENTION

A wireless lighting control module includes, for example, a wireless receiver or transceiver (the wireless unit) receiving an input wireless control signal and producing an analog control output. The analog control output conforms to the well known 0-10V control format as specified in EN60929-a annex E2. The wireless lighting control module also includes by way of illustrative example only, a microcontroller, (the controller) connected to the wireless unit and receiving the input wireless control signal from the wireless unit. The microcontroller such as an analog control circuit or a digital control circuit, or a microprocessor regulates the analog control output. The analog control output has a predetermined cutoff level, and a lighting power output is controlled by the microcontroller in that it is cut off by opening a relay when the analog control output is below the predetermined cutoff level.

The predetermined cutoff level of the analog control output is 0.5V. The analog control output is configured to provide an output current of more than 50 mA. The microprocessor is configured to apply a non-linear relationship between the wireless signal at the input and the analog output signal.

The wireless lighting control module observes the commanded output analog control signal level. The lighting control module turns off a relay when the commanded output analog control signal level is below the predetermined cutoff level. The relay supplies power to a lighting device being controlled. The microprocessor monitors for a request for a change in dimming level. The microprocessor monitors for a dimming response curve selection and then adjusts the analog output level to a value corresponding to the chosen dimming response curve, which is applied to the input wireless control signal.

While not intending to limit the scope of the claims or disclosure, in brief summary, the present disclosure and claims are directed towards an add-on wireless lighting controller for LED lighting which contains a relay for disconnecting power to the controlled lighting below a certain power level, which can implement any desired nonlinear relationship between the digital input command levels and the analog output and which has a 100 mA high power output capable of controlling many LED drivers.

For example, the wireless lighting control module may have a Zigbee input and can have AC power inputs which are converted to DC. These DC outputs are then regulated to provide low voltage power for driving control circuitry. A Zigbee wireless module receives wireless signals from a central controller and outputs control signals to a relay and to a circuit for converting a digital pulse train to a DC level for analog control. The Zigbee wireless module can be programmed to apply a desired nonlinear transformation between the digital Zigbee input signals and the analog output signal. An emitter follower buffers the analog control output to allow up to 100 mA of output current.

The following call out list of elements can be a useful guide in referencing the element numbers of the drawings.
101 Switching Power Supply
122 AC Line
123 AC Neutral
124 AC Ground
110 Relay
111 SW AC Line
114 Operational Amplifier
117 Emitter Follower
105 Zigbee Module
104 Antenna
106 Relay ON/Off Signal
10 New Dim Level
11 Dimming Level 0 Check
12 Relay Turnoff Command
13 Less Than 5% Dimming Level Check
14 Turn On Relay Command
15 Set Up A New Pulse Width Modulation Duty Cycle For The New Dimming Level
16 Linear Dimming Curve Check
17 Linear Formula Selection
18 Modified Linear Check
19 Modified Linear Formula Selection
20 Square Law Check
21 Square Law Formula Selection
22 Modified Square Law Formula Check
23 Modified Square Law Formula Selection
24 Dimming Curve Sensor 2.0 Check
25 Sensor 2.0 Formula Selection
26 Undefined Curve Selection
27 Procedure Return
28 New Dimming Level Receiving Step
29 New Dimming Level Greater Check
30 Fade In Mode Operation
31 Dimming Level Equivalency Check
32 Dimming Level Procedure Return
33 New Dimming Level Lesser Check
34 Fade Out Mode Operation

DETAILED DESCRIPTION OF THE INVENTION

Glossary

Figure 1:
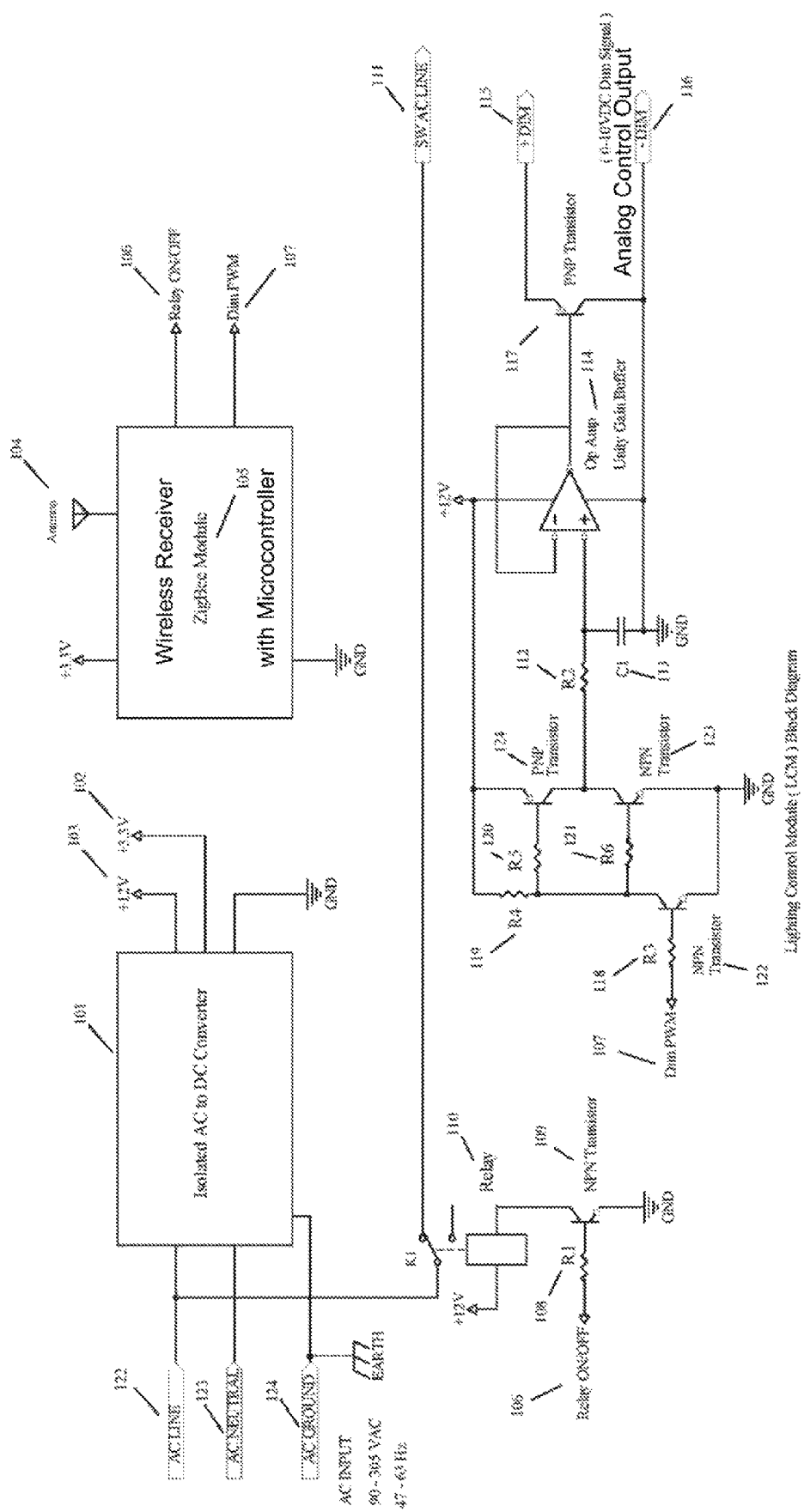
FIG. 1 is a Lighting Control Module (LCM) Block Diagram.

ZigBee is an IEEE 802.15.4-based specification for a suite of high-level communication protocols used to create personal area networks with small, low-power digital radios. AC LINE is alternating current line
AC NEUTRAL is alternating current neutral
AC GROUND is alternating current ground
VAC is alternating current voltage
Hz is Hertz which is cycles per second
NPN transistor is a bipolar transistor with a layer of P doped semi conductor between two N doped layers
SW ACLINE is a relay switched alternating current cutoff switch
PWM pulse train is a pulse width modulation pulse train
+DIM is a positive dimmer contact
−DIM is a negative dimmer contact
EM357 is a name of a microprocessor with built-in ZigBee
MMB Networks is the name of the company that provides Zigbee related hardware and software
D/A converters are digital to analog converters
DC stands for direct current
mA stands for milliamp which is a unit of measure for electric current
V stands for voltage
Z357PA20 is the name of a part number of a ZigBee module manufactured by MMB Networks that can be useful for sourcing the suggested component or a component similar to the suggested component FIG. 1 shows an exemplary schematic of a PC board containing the present invention with a low power built-in switching power supply 101, which converts 90 to 305 VAC, 47 to 63 Hz AC input power sources from AC LINE, AC NEUTRAL and AC GROUND (122, 123, 124) into low voltage 3.3 VDC 102 at 200 mA for powering the ZigBee Module Mesh Network Controller 105. The power supply also provides 12 VDC 103 at 50 mA which (a) powers the relay 110 controlling the AC Line output voltage SW ACLINE 111 to the LED lighting fixtures or devices and (b) powers an operational amplifier 114 with an associated emitter follower 117 which produces the 0-10V output. The Zigbee module 105 has an antenna 104 for wireless communications.

The ZigBee Module 105 outputs two 3.3V logic signals, "Relay ON/OFF" 106 and "Dim PWM" 107. Signal 106 controls the relay switching to on or off, and signal 107 is a 3.3V digital pulse train output, the duty cycle of which represents the desired output dimming level. The "Relay ON/OFF" signal 106 goes through resistor 108 to operate the NPN transistor 109, which applies power to the coil of relay 110. The resulting switched AC LINE output "SW AC LINE" 111 is used to provide a switchable AC line power source for the LED driver load. The 3.3V logic PWM pulse train coming out of the DIM PWM terminal of the Zigbee module is first level shifted into 10V logic PWM by resistors 118, 119, 120, 121 and NPN Transistors 122, 123 and PNP Transistor 124, then integrated using the Resistor/Capacitor network comprising resistor 112 and capacitor 113 so that it becomes a 0-10V DC analog signal by selecting proper resistors values of 118, 119, 120, 121. The operational amplifier 114 is configured to have unity gain to drive the PNP Transistor 117 in emitter-follower configuration and produce the desired 0-10V DC output in standard current sink mode. The output can sink up to 100 mA of current. However, in some specific applications which require current sourcing mode, the PNP transistor 117 can be replaced with an NPN Transistor, and the NPN Transistor 117 Collector Electrode should be disconnected from the −DIM, and rewired to +12V. The output can source up to 100 mA.

The general nature of a microprocessor, and the Zigbee system are explained in a variety of public documents. The useful reference for background information is the book "ZigBee Wireless Networks and Transceivers" by Shahin Farahani. The present invention can provide a Zigbee mesh network end point device. In FIG. 1, Zigbee module 105 receives a wireless signal from a central Zigbee controller, and passes it on wirelessly to other Zigbee modules within range. The ZigBee Mesh Network Control Module used in the design shown in the drawings is a commercially available "MMB Networks®" ZigBee Module part number Z357PA20 or part number Z357PA21 for implementing mesh networks The wireless communication is implemented in the EM357 Microcontroller chip inside the module, which is compliant to the ZigBee Alliance wireless network communication protocol. The Z357PA20 module has "Deep Sleeping Optimization" to save power in the sleep mode. Although the MMB networks module is described here, the present invention can be constructed using any of numerous Zigbee modules or other microprocessor mesh networks products available on the market. The spirit of the invention can also be reproduced using wireless modules other than Zigbee modules.

The Zigbee wireless command signal received by the module 105 is processed by the EM357 chip to implement any desired dimming curve as seen below and the output from the dim PWM terminal of the module is a pulse width modulated rectangular pulse train which is level shifted to an approximately 10V pulse width modulated rectangular pulse train, and then integrated by the resistor 112 and capacitor 113 to produce a DC level representative of the desired dimming level on a scale from zero to approximately 10V. Zero corresponds to no output light and 10V corresponds to full light output with 254 possible intermediate levels of light. In the present invention, amplifier 114 outputs a signal of up to approximately 10V maximum. This signal is then buffered through emitter follower 117 so that the output can sink the analog control signal from a large number of dimming LED drivers, up to a maximum of 100 mA. FIG. 1 presents the most common current sinking design application (0-10V dimming). In some specific applications which require current sourcing, (1-10V dimming) the same design can be used with the minor modification of replacing PNP Transistor 117 by an NPN Transistor and reconnecting the Collector Electrode to +12V. With a suitable choice of transistor, this configuration can achieve 100 mA current sourcing capability. Through the use of an emitter follower output, the lighting control module is able to control the voltage across the control terminals of a large number of dimming drivers so that they all produce the same brightness level in a way well known to users of dimming systems.

Figure 2:
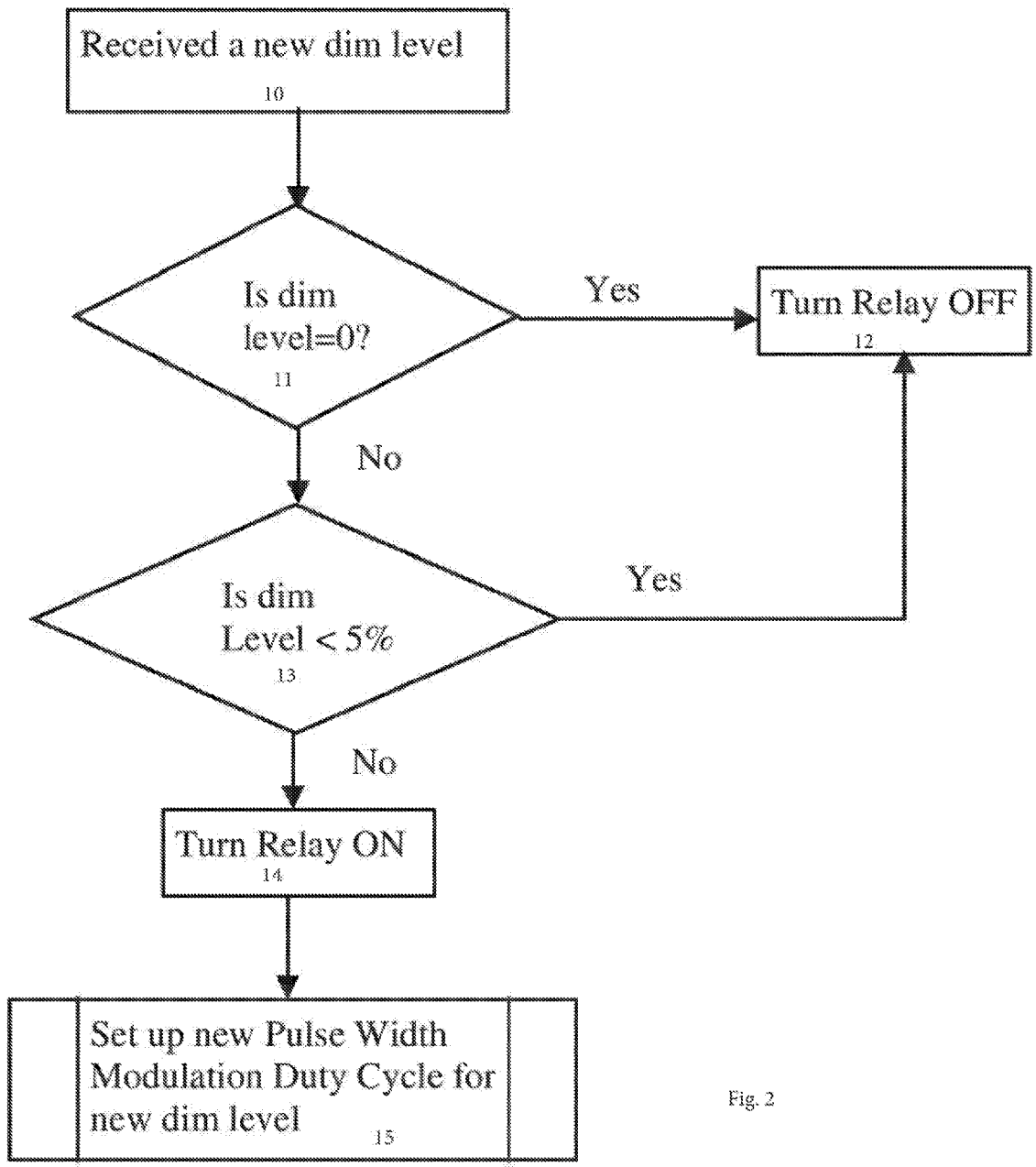
FIG. 2 is a flow chart showing how the relay cut off at 5% dimming is implemented.

When the output control signal is reduced to a planned minimum dimming level, for example 0.5V in 0-10V dimming, the software in the EM357 commands the output voltage on the relay on/off terminal 106 to a low level, switching off transistor 109 and relay 110. In this way, the connected LED driver is completely powered down, reducing power consumption and eliminating any possibility of flickering at extreme low power levels. The details of the method by which this is implemented are detailed as a flow chart in FIG. 2. FIG. 2 describes a method of operating a Zigbee controlled lighting control module involving the step of observing the commanded output analog control signal level, and when that level is below a predetermined threshold, (5% as an illustrative example) turning off a relay which supplies power to the lighting device being controlled.

Figure 3:
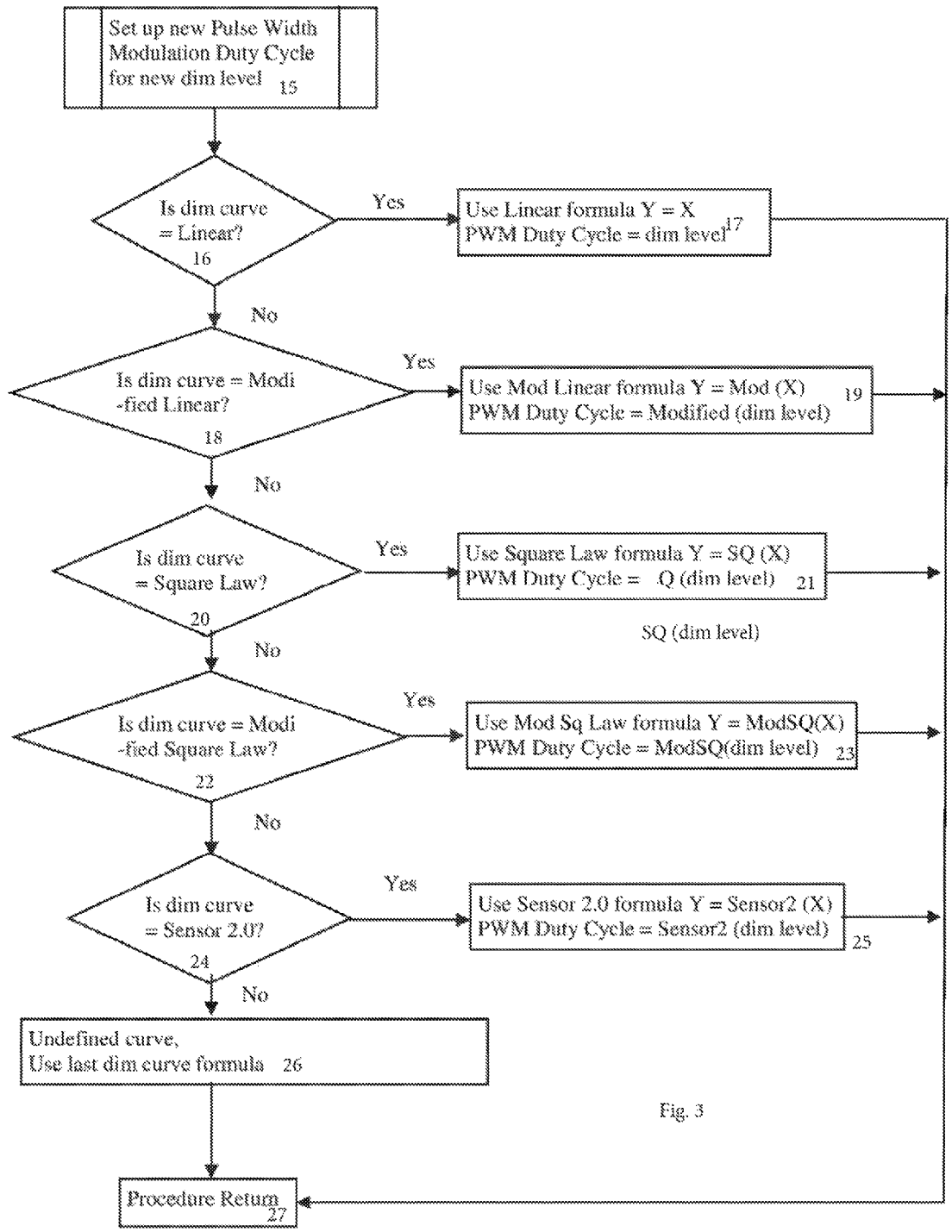
FIG. 3 is a flow chart for implementing chosen dimming curves.

Since the human eye perceives light levels logarithmically then it is not usually desired to decrease light levels in a linear relationship to the incoming Zigbee digital command. Numerous relationships have been described to represent the light perception of the human eye, and one of the first and most well-known is the square law relationship first published by Rea in the 9th edition of the IES Lighting Handbook. This simplistic relationship has various weaknesses which have led to a variety of improved relationships, all intended to better reflect the perception of the human eye under different circumstances. For this reason the present invention offers the capability of implementing a plurality of different relationships between the input digital signal and the output analog control signal as shown in FIG. 3. Thus, FIG. 3 describes a method of operating a Zigbee controlled lighting control module involving the steps of observing a request for a change in dim level, checking for which dimming response curve is chosen and then adjusting the analog output level to a value corresponding to the chosen dimming response curve applied to the input Zigbee control signal.

Figure 4:
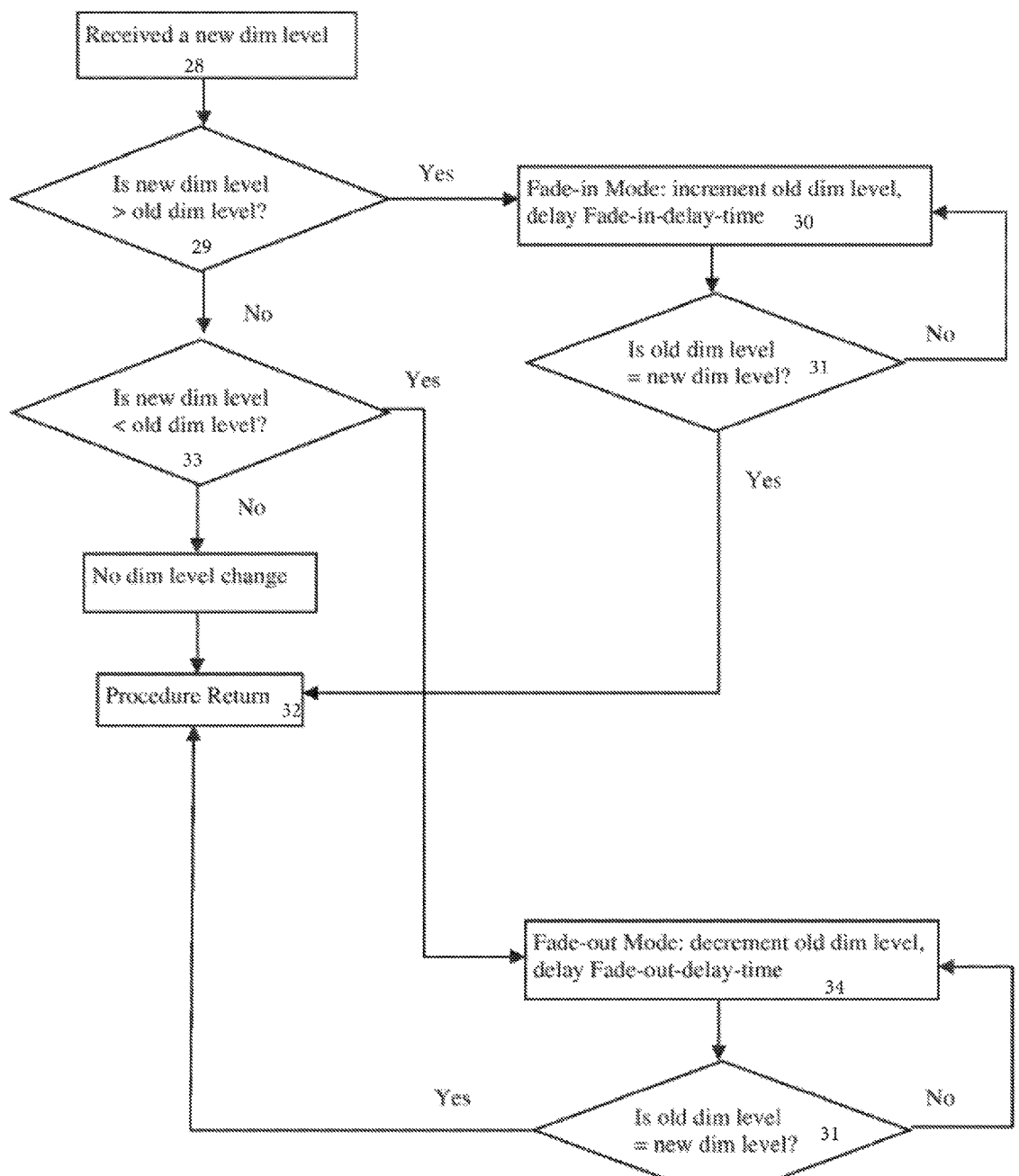
FIG. 4 is a flow chart for implementing custom fade in and fade out rates.

Another property of the present invention is the ability to program the EM357 in such a manner as to control the rate of change of light. For example, when a light is abruptly turned on in, for example a single millisecond from off to full brightness, the human perception is shocked and it is a less pleasant experience than if the light is ramped on smoothly over for example in a half second. Similarly it is usually more gratifying for a human being to perceive a light fading away over a fraction of a second than to see the light extinguished instantaneously. For this reason, the EM357 is programmed to limit the relative rate of change of the output light—even if an instantaneous change is received from the digital signal, the module will enact this change at a predetermined rate. The present invention thus provides a light fading algorithm for light intensity change control. The flow chart to control light intensity rate of change is shown in FIG. 4.

Although the present invention was illustrated by examples of driving LED drivers, any lighting source could be used. The chips described were the Zigbee chip set sold by MMB networks, however there are numerous similar devices available that can perform the same functions. Other wireless control modules exist which can receive control signals without using Zigbee, and these can still embody the principles of the invention. The output described was a 0-10V analog control output, however 1-10V control, PWM control, phase control or any of the numerous well known lighting control formats can be used to make the invention. A mechanical relay was shown for example, however any other kind of relay such as a solid state relay could be used. The power supply was shown as being isolated, but the invention could be embodied equally well without isolation. Simple resistor capacitor circuits were shown for integrating pulse trains to DC levels, however more elaborate circuits using operational amplifiers could be used and also some microprocessors embody D/A converters which output a DC level directly from a digital processor chip.

The microcontroller can be programmed using a variety of different languages such as C. According to FIG. 2, the microcontroller first receives a new dim level 10 and then the microcontroller does a dimming level zero check 11. If the dimming level is zero, the microcontroller issues a relay turnoff command 12. If the dimming level is not zero, the microcontroller checks to see if the dimming level is less than 5% in a less than 5% dimming level check 13. If the dimming level is less than 5%, then the microcontroller issues a relay turnoff command 12. If the dimming level is more than 5% or equal to 5%, the microcontroller issues a turn on relay command 14. After the microcontroller issues the turn on relay command 14. The microcontroller sets up a new pulse width modulation duty cycle for the new dimming level 15. Therefore, the microcontroller does a first dimming level check at zero and then a second dimming level check at a higher than zero amount such as 5%.

According to FIG. 3, the microcontroller then checks to see if the dimming curve is linear in a linear dimming curve check 16. If the dimming curve is linear, then the microcontroller applies a linear formula in a linear formula selection 17. If the dimming curve is not linear, the microcontroller checks to see if the dimming curve is a modified linear in a modified linear check 18. If the dimming curve is a modified linear formula than the microcontroller selects a modified linear formula in a modified linear formula selection 19. If the dimming curve is not a modified linear formula, the microcontroller then checks to see if the dimming curve is a square law dimming curve in a square law check 20. If the dimming curve is a square law formula, the microcontroller selects the square law formula in a square law formula selection 21.

If the dimming curve is not a square law formula, then the microcontroller checks to see if the dimming curve is a modified square law formula in a modified square law formula check 22. If the dimming curve is a modified square law formula, the microcontroller selects the modified square law formula in a modified square law formula selection 23. If the dimming curve is not a modified square law formula, the microcontroller then checks to see if the dimming curve is a sensor 2.0 dimming curve in a dimming curve sensor 2.0 check 24. If the dimming curve is a sensor 2.0 dimming curve, then the microprocessor selects the sensor 2.0 formula in a sensor 2.0 formula selection 25. If the dimming curve is not a sensor 2.0 formula, the microprocessor selects an undefined curve in an undefined curve selection 26. After any of the selections including the linear formula selection 17, the modified linear formula selection 19, the square law formula selection 21, the modified square law formula selection 23, the sensor 2.0 formula selection 25, or the undefined curve selection 26, the microprocessor reverts to a procedure return 27.

The microprocessor may also receive a new dimming level in a new dimming level receiving step 28. (FIG. 4) The microprocessor then checks to see if the new dimming level is greater than the previous dimming level in a new dimming level greater check 29. If the new dimming level is greater, then the microprocessor activates a fade in mode in a fade in mode operation 30. The fade in mode operation 30 includes a first step of incrementing the old dimming level then a delay in the fade in. After incrementing the dimming level, the microprocessor does a dimming level equivalency check 31. If the dimming level equivalency check 31 shows that the old dimming level is not equal to the new dimming level, then the fade in mode operation 30 is activated again. If the new and old dimming levels are the same, then the dimming level adjustment is finished and the operation goes to a dimming level procedure return 32.

If the microprocessor does a new dimming level greater check 29 and the new dimming level is not greater, then the microprocessor does a new dimming level lesser check 33. If the new dimming level lesser check 33 is positive, then the microprocessor starts a fade out mode operation 34. The fade out mode operation 34 is iterative in the same manner that the fade in mode operation 30 is iterative. After each fade out mode operation, the microprocessor checks to see if the old dimming level is the same as the new dimming level in a dimming level equivalency check 31. The fade out mode operation 34 continues until the dimming level equivalency check 31 is met upon which the operation reverts to the dimming level procedure return 32.

For illustration purposes, the Zigbee wireless control was described throughout, however any wireless control system could equally well embody the invention. It will be apparent to those skilled in the art that various modifications and variations can be made in the present invention without departing from the spirit or scope of the invention. For example, a wide variety of different brands of microcontrollers can provide the same or a similar functionality. Thus, it is intended that the present invention cover the modifications and variations of this invention provided they come within the scope of the appended claims and their equivalents.

The invention claimed is:

1. A wireless lighting control module comprising:
   a. a wireless receiver receiving an input wireless control signal;
   b. an analog control output, wherein the analog control output conforms to a 0-10V format; and
   c. a microcontroller, connected to the wireless receiver and receiving the input wireless control signal from the wireless receiver, wherein the microcontroller regulates the analog control output, wherein the analog control output has a predetermined cutoff level, wherein a lighting power output is controlled by the microcontroller and cut off by opening a relay when the analog control output is below the predetermined cutoff level, wherein the microcontroller monitors a request for a change in dimming level, wherein the microcontroller monitors a dimming response curve selection and then adjusts an analog output level to a value corresponding to the chosen dimming response curve, which is applied to the input wireless control signal.

2. The wireless lighting control module of claim 1, wherein the predetermined cutoff level of the analog control output is 0.5V, wherein the analog control output is configured to provide an output current of more than 50 mA.

3. A wireless lighting control module comprising:
   a. a wireless receiver receiving an input wireless control signal;
   b. an analog control output, wherein the analog control output conforms to a 0-10V format; and c. a microcontroller, connected to the wireless receiver and receiving the input wireless control signal from the wireless receiver, wherein the microcontroller regulates the analog control output, wherein the analog control output has a predetermined cutoff level, wherein a lighting power output is controlled by the microcontroller and cut off by opening a relay when the analog control output is below the predetermined cutoff level, wherein the lighting control module turns off a relay when a commanded output analog control signal level is below the predetermined cutoff level, where the relay supplies power to a lighting device being controlled, wherein the microcontroller monitors a request for a change in dimming level, wherein the microcontroller monitors a dimming response curve selection and then adjusts the analog output level to a value corresponding to the chosen dimming response curve, which is applied to the input wireless control signal.

4. The wireless lighting control module of claim 3, wherein the microcontroller is configured to apply a non-linear relationship between a wireless signal at an input and an analog output signal, wherein the wireless lighting control module observes a commanded output analog control signal level.

5. The wireless lighting control module of claim 3, wherein the predetermined cutoff level of the analog control output is 0.5V, wherein the analog control output is configured to provide an output current of more than 50 mA, wherein the microcontroller is configured to apply a non-linear relationship between a wireless signal at an input and an analog output signal, wherein the wireless lighting control module observes a commanded output analog control signal level.

6. The wireless lighting control module of claim 3, wherein the wireless receiver includes a wireless transmitter so that the wireless receiver is a wireless transceiver.

7. The wireless lighting control module of claim 6, wherein the microcontroller monitors a request for a change in dimming level, wherein the microcontroller monitors a dimming response curve selection and then adjusts the analog output level to a value corresponding to the chosen dimming response curve, which is applied to the input wireless control signal.

8. The wireless lighting control module of claim 6, wherein the microcontroller is configured to apply a non-linear relationship between the wireless signal at the input and the analog output signal, wherein the wireless lighting control module observes a commanded output analog control signal level, wherein the lighting control module turns off a relay when the commanded output analog control signal level is below a predetermined cutoff level, wherein the relay supplies power to a lighting device being controlled, wherein the microcontroller monitors a request for a change in dimming level, wherein the microcontroller monitors a dimming response curve selection and then adjusts the analog output level to a value corresponding to the chosen dimming response curve, which is applied to the input wireless control signal.

9. The wireless lighting control module of claim 6, wherein the lighting control module turns off a relay when a commanded output analog control signal level is below a predetermined cutoff level, wherein the relay supplies power to a lighting device being controlled, wherein the microcontroller monitors a request for a change in dimming level, wherein the microcontroller monitors a dimming response curve selection and then adjusts the analog output level to a value corresponding to the chosen dimming response curve, which is applied to the input wireless control signal.

* * * * *